United States Patent
Hommi et al.

(10) Patent No.: US 7,445,066 B2
(45) Date of Patent: Nov. 4, 2008

(54) VEHICLE CONTROL DEVICE, CAR HAVING THE DEVICE, AND METHOD OF CONTROLLING THE CAR

(75) Inventors: Akira Hommi, Aichi-ken (JP); Kiyotaka Hamajima, Okazaki (JP); Mitsuhiro Nada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 671 days.

(21) Appl. No.: 10/525,727

(22) PCT Filed: Jul. 7, 2003

(86) PCT No.: PCT/JP03/08595
§ 371 (c)(1), (2), (4) Date: Feb. 28, 2005

(87) PCT Pub. No.: WO2004/022950
PCT Pub. Date: Mar. 18, 2004

(65) Prior Publication Data
US 2005/0241868 A1 Nov. 3, 2005

(30) Foreign Application Priority Data
Sep. 3, 2002 (JP) ............................. 2002-257467

(51) Int. Cl.
*B60K 6/00* (2007.10)
(52) U.S. Cl. ............ 180/65.2; 180/197; 180/279; 180/65.1; 180/65.8; 701/82; 701/70; 701/84; 701/90
(58) Field of Classification Search ............ 180/65.2, 180/197, 279, 65.1, 65.8; 701/82, 70, 84, 701/90
See application file for complete search history.

(56) References Cited

U.S. PATENT DOCUMENTS

| | | | | |
|---|---|---|---|---|
| 5,159,990 A | * | 11/1992 | Abe et al. ................. | 180/197 |
| 5,269,390 A | | 12/1993 | Glover et al. | |
| 5,471,386 A | * | 11/1995 | Hrovat et al. ............. | 701/82 |
| 5,566,776 A | * | 10/1996 | Iwata ....................... | 180/197 |
| 6,182,002 B1 | * | 1/2001 | Bauerle et al. ............ | 701/82 |
| 6,473,683 B1 | * | 10/2002 | Nada ........................ | 701/82 |
| 2006/0237244 A1 | * | 10/2006 | Hommi ..................... | 180/65.2 |

FOREIGN PATENT DOCUMENTS

| | | |
|---|---|---|
| EP | 0 349 993 | 1/1990 |
| EP | 0 349 993 A3 | 1/1990 |
| JP | 02-016341 | 1/1990 |
| JP | 02-027124 | 1/1990 |
| JP | 10-246132 | 9/1998 |
| JP | 10-304514 | 11/1998 |
| JP | 11-093727 | 4/1999 |
| JP | 2000-274270 | 10/2000 |
| JP | 2001-065382 | 3/2001 |
| JP | 2001-171378 | 6/2001 |
| JP | 2001-295676 | 10/2001 |
| JP | 2002-030952 | 1/2002 |

OTHER PUBLICATIONS

European Communication for Appln. No. 03 741 240.0-1254 dated Dec. 13, 2006.

* cited by examiner

*Primary Examiner*—Christopher P. Ellis
*Assistant Examiner*—Cynthia F. Collado
(74) *Attorney, Agent, or Firm*—Kenyon & Kenyon LLP

(57) ABSTRACT

When a computed torque command value Tr* of a ring gear shaft as a drive shaft exceeds a maximum torque Tmax, skid occurring state control (step S118) triggered by detection of the occurrence of a skid calculates a torque restriction rate KT (=Tmax/Tr*) and restricts the torque output to the ring gear shaft to a maximum torque Tmax. In a next cycle of a drive control routine, a power demand Pr, which is calculated from inputs of accelerator pedal position AP and vehicle speed V at step S105, is limited to the product of the power demand Pr and a power restriction rate KP (=KT) at step S107. The control with the limited power demand Pr desirably prevents a large engine noise beyond the driver's expectation based on the vehicle driving state.

14 Claims, 8 Drawing Sheets

VEHICLE CONTROL DEVICE, CAR HAVING THE DEVICE, AND METHOD OF CONTROLLING THE CAR

This is a 371 national phase application of PCT/JP2003/008595 filled 7 Jul. 2003, claiming priority to Japanese Patent Application No. 2002-257467 filed 3 Sep. 2002, the contents of which are incorporated herein by reference.

FIELD OF THE INVENTION

The present invention relates to a vehicle control apparatus, a vehicle with the apparatus and a vehicle control method. Specifically, the invention relates to a vehicle control apparatus for a vehicle in which a motor is driven with power of an engine to rotate a drive shaft linked to drive wheels, a vehicle with the apparatus and a vehicle control method.

BACKGROUND ART

Various vehicle control apparatuses are used to determine a power demand to be output to a drive shaft linked to drive wheels according to a vehicle driving state, set a target torque and a target rotation speed of an engine corresponding to the determined power demand, and control the engine and a motor with the setting values. Some vehicle control apparatuses have been proposed to restrict the torque level output from the motor to the drive wheels, in response to the occurrence of a skid on the drive wheels (see, for example, Japanese Patent Laid-Open Gazette No. 10-304514 and No. 13-295676).

These prior art techniques, however, do not limit the power demand to be output to the drive shaft, while restricting a torque demand to the motor in response to the occurrence of a skid on the drive wheels. This causes a large engine noise beyond the driver's expectation based on the vehicle driving state and makes the driver feel uncomfortable.

In order to eliminate the drawbacks of the prior art techniques mentioned above, a vehicle control apparatus of the invention, where a motor is driven by the power of an engine to rotate a drive shaft linked to drive wheels, aims to prevent the driver from feeling uncomfortable under skid control.

DISCLOSURE OF THE INVENTION

At least part of the above and the other related objects is attained by the following configurations of a vehicle control apparatus and a corresponding vehicle control method of the invention and a vehicle of the invention with a vehicle control apparatus mounted thereon.

The present invention is directed to a vehicle control apparatus, where a motor is driven with power of an engine to rotate a drive shaft linked to drive wheels. The vehicle control apparatus includes: a power demand determination module that determines a power demand to be output to the drive shaft according to a vehicle driving state; a control module that controls the engine and the motor with the determined power demand; a skid detection module that detects a skid occurring on the drive wheels; and a torque restriction module that, in response to detection of a skid by the skid detection module, restricts a torque level of the drive wheels for reduction of the skid. Under restriction of the torque level of the drive wheels by the torque restriction module, the power demand determination module limits the power demand, which is determined according to the vehicle driving state, with power restriction rate that is regulated to have a specified relation to a torque restriction rate of restricting the torque level of the drive wheels.

The vehicle control apparatus determines the power demand to be output to the drive shaft according to the vehicle driving state, and controls the engine and the motor with the determined power demand. In response to detection of a skid occurring on the drive wheels, the torque level of the drive wheels is restricted for reduction of the skid. Under restriction of the torque level of the drive wheels, the vehicle control apparatus limits the power demand, which is determined according to the vehicle driving state, with a power restriction rate that is regulated to have a specified relation to a torque restriction rate of restricting the torque level of the drive wheels. The control of the engine with the unchanged large power demand to be output to the drive shaft under the restriction of the torque level of the drive wheels causes a large engine noise beyond the driver's expectation based on the vehicle driving state with restriction of the torque level. The vehicle control apparatus of the invention limits the power demand under such conditions, thus restraining a large engine noise beyond the driver's expectation based on the vehicle driving state and preventing the driver from feeling uncomfortable.

In one preferable embodiment of the vehicle control apparatus of the invention, the power demand determination module limits the power demand, which is determined according to the vehicle driving state, with a fixed setting of the power restriction rate, regardless of a variation in torque restriction rate of restricting the torque level of the drive wheels. This arrangement prevents an uncomfortable change of the engine noise by relatively simple control.

In another preferable embodiment of the vehicle control apparatus of the invention, the power demand determination module limits the power demand, which is determined according to the vehicle driving state, with the power restriction rate that is regulated corresponding to the torque restriction rate of restricting the torque level of the drive wheels. A high level of restriction of the torque level of the drive wheels thus results in significant limitation of the power demand. A low level of restriction of the torque level of the drive wheels results in slight limitation of the power demand. This arrangement desirably prevents the driver from feeling uncomfortable.

In this preferable embodiment of the vehicle control apparatus of the invention, the power demand determination module may limit the power demand, which is determined according to the vehicle driving state, with the power restriction rate that is regulated to approach to the torque restriction rate with elapse of time. Even in the case of an abrupt variation in torque restriction rate, this arrangement ensures a moderate change of the power demand with limitation of the gradually varying power restriction rate with elapse of time. The moderate change of the power demand results in a smooth change of the engine noise and effectively prevents the driver from feeling uncomfortable.

In the vehicle control apparatus of the invention, it is preferable that the torque restriction module restores the restricted torque level of the drive wheels with moderate limitation of the torque level of the drive wheels after convergence of the skid detected by the skid detection module. This arrangement desirably prevents abrupt cancellation of the torque restriction of the drive wheels and generation of a large torque immediately after convergence of the skid. The power demand, which is determined according to the vehicle driving state, is limited even in the period of this moderate restriction of the torque level of the drive wheels. Such control results in a smooth change of the engine noise and effectively prevents the driver from feeling uncomfortable.

In one preferable embodiment of the invention, the vehicle control apparatus further includes: an accumulator that is capable of driving the motor simultaneously with or independently of the engine; and an engine stop prohibition module that controls the accumulator to drive the motor and prohibits a stop of the engine under limitation of the power demand, which is determined according to the vehicle driving state, by the power demand determination module. The limitation level of the power demand, which is determined according to the vehicle driving state, may be satisfied by only electric power output from the accumulator (for example, a battery or a capacitor) to drive the motor and rotate the drive shaft. Even under such conditions, the vehicle control apparatus of this embodiment does not stop the engine but keeps the engine stand by for an immediate response to an increase in power demand after cancellation of the restriction of the torque level of the drive wheels. The engine may be run idle or kept at an idle without a stop.

The present invention is also directed to a vehicle with the vehicle control apparatus in any arrangements described above mounted thereon. The vehicle with the vehicle control apparatus of the invention achieves the equivalent effects to those of the vehicle control apparatus of the invention. The control of the engine with the unchanged large power demand to be output to the drive shaft under the restriction of the torque level of the drive wheels causes a large engine noise beyond the driver's expectation based on the vehicle driving state with restriction of the torque level. The vehicle with the vehicle control apparatus of the invention limits the power demand under such conditions, thus restraining a large engine noise beyond the driver's expectation based on the vehicle driving state and preventing the driver from feeling uncomfortable.

The present invention is further directed to a vehicle control method for a vehicle, where a motor is driven with power of an engine to rotate a drive shaft linked to drive wheels. The vehicle control method includes the steps of: (a) determining a power demand to be output to the drive shaft according to a vehicle driving state; (b) controlling the engine and the motor with the determined power demand; (c) detecting a skid occurring on the drive wheels; and (d) restricting a torque level of the drive wheels for reduction of the skid, in response to detection of a skid in said step (c), wherein under restriction of the torque level of the drive wheels by said step (d), said step (b) limits the power demand, which is determined according to the vehicle driving state.

The vehicle control method determines the power demand to be output to the drive shaft according to the vehicle driving state, and controls the engine and the motor with the determined power demand. In response to detection of a skid occurring on the drive wheels, the torque level of the drive wheels is restricted for reduction of the skid. Under restriction of the torque level of the drive wheels, the method limits the power demand, which is determined according to the vehicle driving state. The control of the engine with the unchanged large power demand to be output to the drive shaft under the restriction of the torque level of the drive wheels causes a large engine noise beyond the driver's expectation based on the vehicle driving state with restriction of the torque level. The vehicle control method of the invention limits the power demand under such conditions, thus restraining a large engine noise beyond the driver's expectation based on the vehicle driving state and preventing the driver from feeling uncomfortable.

BEST MODES OF CARRYING OUT THE INVENTION

Figure 1:
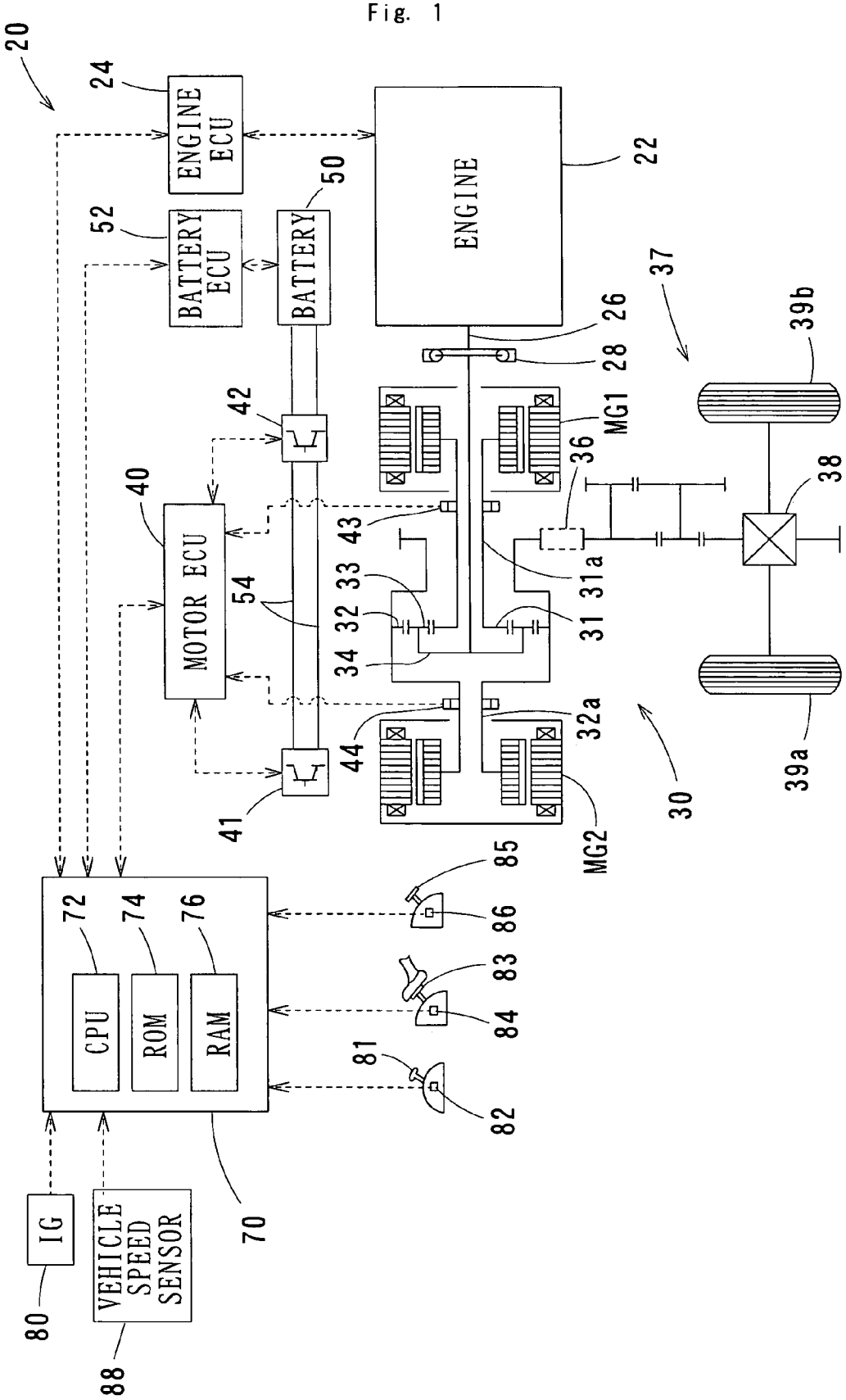
FIG. 1 schematically illustrates the configuration of a hybrid vehicle in one embodiment.

One preferable embodiment of the invention is described below with reference to the accompanied drawings. FIG. 1 schematically illustrates the configuration of a hybrid vehicle 20 with a vehicle control apparatus of the invention mounted thereon. The hybrid vehicle 20 includes an engine 22, a three shaft-type power distribution integration mechanism 30 that is linked to a crankshaft 26 as an output shaft of the engine 22 via a damper 28, a first motor MG1 that is connected with the power distribution integration mechanism 30, a second motor MG2 that is also connected with the power distribution integration mechanism 30, and a hybrid electronic control unit 70 that controls the whole driving system of the vehicle. Hereafter the electronic control unit is referred to as the ECU.

The engine 22 is an internal combustion engine that uses a hydrocarbon fuel, such as gasoline or light oil, to output power. An engine ECU 24 receives signals from diverse sensors that detect operating conditions of the engine 22, and takes charge of operation control of the engine 22, for example, fuel injection control, ignition control, and intake air flow regulation. The engine ECU 24 communicates with the hybrid ECU 70 to control operations of the engine 22 in response to control signals transmitted from the hybrid electronic control unit 70 while outputting data relating to the operating conditions of the engine 22 to the hybrid electronic control unit 70 according to the requirements.

The power distribution integration mechanism 30 has a sun gear or external gear 31, a ring gear or internal gear 32 that is arranged concentrically with the sun gear 31, multiple pinion gears 33 that engage with both the sun gear 31 and the ring gear 32, and a carrier 34 that holds the multiple pinion gears 33 to allow their revolutions and rotations on their axes. The power distribution integration mechanism 30 is constructed as a planetary gear mechanism that has differential motions with the sun gear 31, the ring gear 32, and the carrier 34 as rotating elements. In the power distribution integration mechanism 30, the carrier 34 is linked with the crankshaft 26 of the engine 22, the sun gear 31 is linked with the motor MG1, and the ring gear 32 is linked with the motor MG2. When the motor MG1 functions as an electric generator, the power output from the engine 22 and transmitted through the carrier 34 is distributed to the sun gear 31 and the ring gear 32 at their gear ratio. When the motor MG1 functions as an electric motor, on the other hand, the power output from the engine 22 and transmitted through the carrier 34 is integrated with the power output from the motor MG1 and transmitted through the sun gear 31 and is output to the ring gear 32. The ring gear 32 is mechanically linked to drive wheels 39a and 39b as front wheels of the vehicle via a belt 36, a gear mechanism 37, and a differential gear 38. The power output to the ring gear 32 is accordingly transmitted to the drive wheels 39a and 39b via the belt 36, the gear mechanism 37, and the differential gear 38. The three shafts linked to the power distribution integration mechanism 30 in the driving system are the crankshaft 26 as the output shaft of the engine 22 connected with the carrier 34, a sun gear shaft 31a as a rotating shaft of the first motor MG1 connected with the sun gear 31, and a ring gear shaft 32a as a drive shaft connected with the ring gear 32 and mechanically linked to the drive wheels 39a and 39b.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor ECU 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery ECU 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid ECU 70 according to the requirements. The battery ECU 52 calculates a state of charge (SOC) of the battery 50, based on the accumulated charge-discharge current measured by the current sensor, for control of the battery 50.

The hybrid ECU 70 is constructed as a microprocessor including a CPU 72, a ROM 74 that stores processing programs, a RAM 76 that temporarily stores data, a non-illustrated input-output port, and a non-illustrated communication port. The hybrid ECU 70 receives various signals via the input port: an ignition signal from an ignition switch 80, a gearshift position SP from a gearshift position sensor 82 that detects the current position of a gearshift lever 81, an accelerator opening AP from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 is connected with the engine ECU 24, the motor ECU 40, and the battery ECU 52 via the communication port and transmits diverse control signals and data to and from the engine ECU 24, the motor ECU 40, and the battery ECU 52, as mentioned above.

The hybrid vehicle 20 of the embodiment thus constructed calculates a torque demand Pr to be output to the ring gear shaft 32a functioning as the drive shaft, based on observed values of a vehicle speed V and an accelerator opening AP, which corresponds to a driver's step-on amount of the accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

The description now regards series of drive control of the hybrid vehicle 10, especially drive control operations including motor drive control in the event of the occurrence of a skid on the drive wheels 39a and 39b. A drive control program is stored in a ROM 74 of the hybrid ECU 70 and is repeatedly executed by the CPU 72 at preset time intervals (for example, at every 8 msec). The description below is on the assumption of no requirement of charging the battery 50 by the engine 22.

Figure 3:
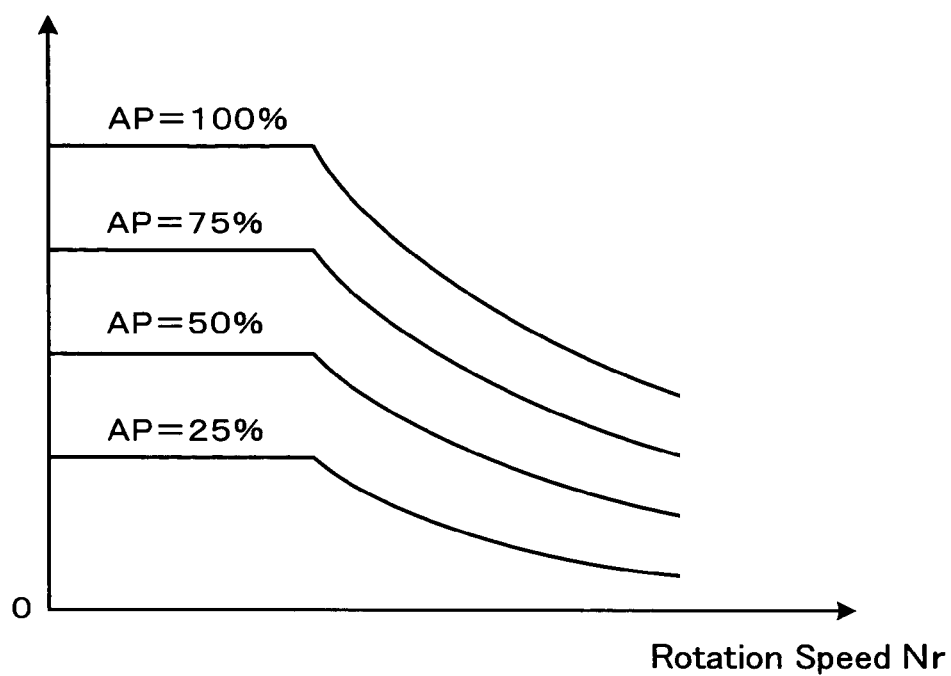
FIG. 3 shows an example of a setting map of a torque command value to vehicle speed and an accelerator opening.

When the drive control program starts, the CPU 72 of the hybrid ECU 70 inputs a rotation speed Nr of the ring gear shaft 32a (step S100). The rotation speed Nr of the ring gear shaft 32a is computed from a rotational angle θr of the ring gear shaft 32a read from the rotation speed sensor 44. The CPU 72 then reads the accelerator pedal position AP from the accelerator pedal position sensor 84 (step S102). The driver depresses the accelerator pedal 83 when feeling an insufficiency of power used to drive the vehicle. The accelerator pedal position AP accordingly reflects a power demand required by the driver. The CPU 72 subsequently sets a torque command value Tr* as a target torque to be output to the ring gear shaft 32a, corresponding to the input accelerator pedal position AP (step S104). One concrete procedure stores in advance a map, which represents variations in torque command value Tr* against the rotation speed Nr of the ring gear shaft 32a and the accelerator pedal position AP, in the ROM 74 and reads the torque command value Tr* corresponding to the given accelerator pedal position AP and the given rotation speed Nr of the ring gear shaft 32a from the map. One example of the map is shown in FIG. 3.

The CPU 72 of the hybrid ECU 70 then computes a power demand Pr (Pr=Tr*×Nr) to be output to the ring gear shaft 32a as the drive shaft from the set torque command value Tr* and the input rotation speed Nr of the ring gear shaft 32a (step S105). The CPU 72 checks the setting of a power restriction flag F (step S106). The power restriction flag F is set to 1 under restriction of the torque command value Tr* of the ring gear shaft 32a, while being reset to 0 under no such restriction. The power restriction flag F is reset to 0 at a start of the driving system. In response to the setting '0' of the power restriction flag F, the CPU 72 directly goes to step S108. In response to the setting '1' of the power restriction flag F, on the other hand, there is restriction of the torque output to the ring gear shaft 32a. The CPU 72 limits the power demand Pr according to the level of the torque restriction (step S107) before proceeding to step S108. The restriction of the torque output to the ring gear shaft 32a limits the torque command value Tr* to a maximum torque Tmax when the torque command value Tr* set at step S110 exceeds the maximum torque Tmax, as discussed later in detail. A torque restriction rate KT (=Tmax/Tr*) is obtained in advance in a skid occurring state control routine (step S118) or in a skid convergence state control routine (step S124), and is utilized as a power restriction rate KP of limiting the power demand Pr at step S107 in a next cycle of this drive control routine.

At step S108, a target torque Te* and a target rotation speed Ne* of the engine 22 is set, based on the power demand Pr to be output to the ring gear shaft 32a. Under no restriction of the torque output to the ring gear shaft 32a, the power demand Pr adopted at step S108 is equal to the computed power demand Pr at step S105. Under restriction of the torque output to the ring gear shaft 32a, on the other hand, the power demand Pr adopted at step S108 is equal to the limited power demand Pr at step S106. The power demand Pr is the product of the target torque Te* and the target rotation speed Ne* (on the assumption of no charge or discharge of the battery 50). There are innumerable combinations of the target torque Te* and the target rotation speed Ne* to give the power demand Pr. One preferable procedure empirically determines desired combinations of the target torque Te* and the target rotation speed Ne* that ensure highly efficient and smooth driving, and stores the desired combinations in the form of a map (not shown) in the ROM 74. The target torque Te* and the target revolution speed Ne* corresponding to the given power demand Pr are then read from this map. A torque command value Tm2* of the second motor MG2 is calculated from the torque command value Tr* of the ring gear shaft 32a, the target torque Te* of the engine 22, and a gear ratio ρ (=the number of teeth of the sun gear/the number of teeth of the ring gear) (step S110). A target rotation speed Nm1* of the first motor MG1 is then set corresponding to the target rotation speed Ne* of the engine 22 and a rotation speed Nm2 of the second motor MG2 (step S112). The engine 22 is directly linked to the carrier 34, so that the rotation speed Ne of the engine 22 is identical with a rotation speed Nc of a planetary carrier shaft 34a. The second motor MG2 is directly linked to the ring gear 32, so that the rotation speed Nm2 of the second motor MG2 is identical with the rotation speed Nr of the ring gear shaft 32a. The first motor MG1 is directly linked to the sun gear 31, so that the rotation speed Nm1 of the first motor MG1 is identical with a rotation speed Ns of the sun gear shaft 31a. Setting two of the rotation speeds Nc, Nr, and Ns automatically determines the residual rotation speed. At step S112, the target rotation speed Nm1* of the first motor MG1 is accordingly set corresponding to the target rotation speed Ne* of the engine 22 and the rotation speed Nr of the ring gear shaft 32a input at step S100. The torque command value Tm2* of the second motor MG2 is calculated at step S110 according to Equation (1) given below:

$$Tm2^* \leftarrow Tr^* - Te^* \times (1/(1+\rho)) \tag{1}$$

The CPU 72 subsequently detects occurrence or no occurrence of a skid of the hybrid vehicle 20 (step S114). A concrete procedure calculates an angular acceleration α from the rotation speed Nr of the ring gear shaft 32a input at step S100, and compares the calculated angular acceleration α with a preset threshold value αslip, which is determined empirically as a value of angular acceleration in the occurrence of a skid. When the calculated angular acceleration α exceeds the preset threshold value αslip, the occurrence of a skid is determined. The calculation of the angular acceleration α in this embodiment subtracts a previous rotation speed Nr input in a previous cycle of this drive control routine from a current rotation speed Nr input in the current cycle of this drive control routine (current rotation speed Nr−previous rotation speed Nr). The unit of the angular acceleration α is [rpm/8 msec] since the execution interval of this drive control routine is 8 msec in this embodiment, where the rotation speed Nr is expressed by the number of rotations per minute [rpm]. Any other suitable unit may be adopted for the angular acceleration α as long as the angular acceleration α is expressible as a time rate of change of rotation speed. In order to minimize a potential error, the angular acceleration α may be an average of angular accelerations calculated in a preset number of cycles of this drive control routine (for example, 3).

In response to detection of no occurrence of a skid at step S114, the CPU 72 checks the setting of the power restriction flag F (step S120). When the power restriction flag F is equal to 0 at step S120, that is, in the driving state where no skid occurs and no restriction is set on the torque output to the ring gear shaft 32a, the engine 22, the first motor MG1, and the second motor MG2 are controlled with the respective setting values obtained at steps S108 to S112 (step S126). The drive control routine is then terminated.

Figure 4:
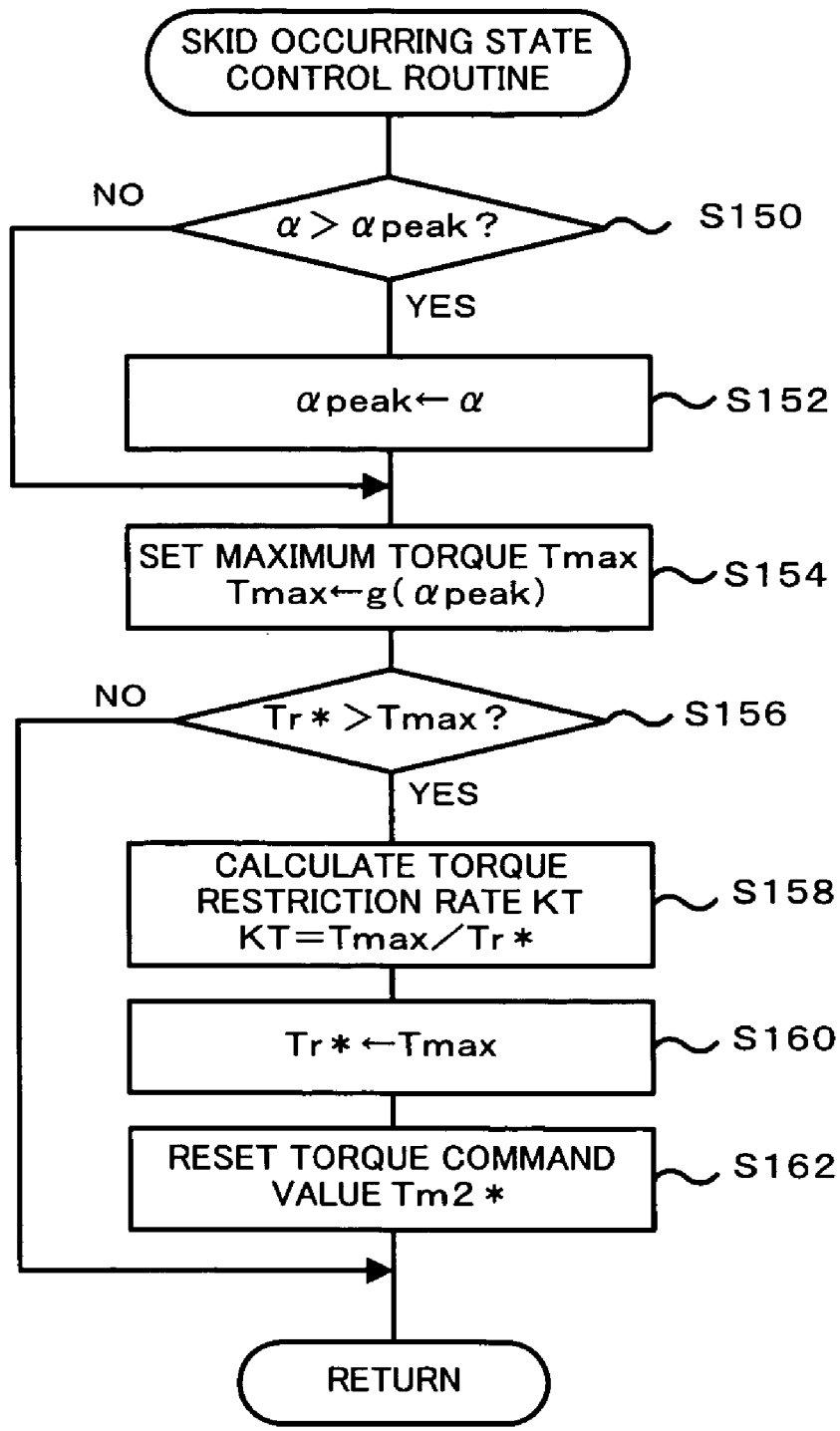
FIG. 4 is a flowchart showing a skid occurring state control routine.
Figure 5:
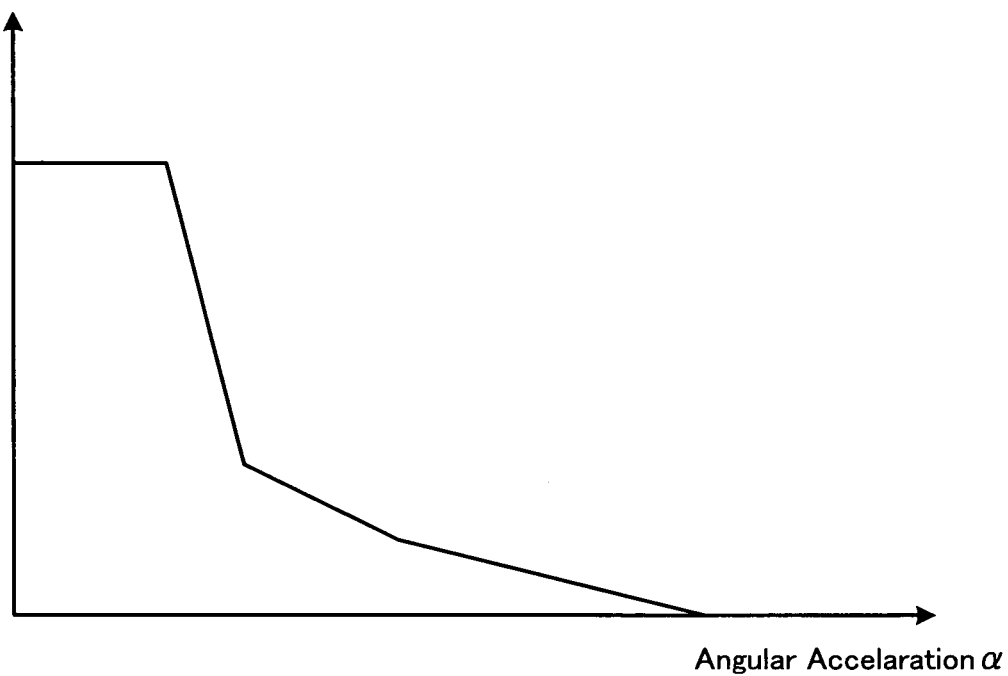
FIG. 5 is a map showing a variation in maximum torque against an angular acceleration.

In response to detection of the occurrence of a skid at step S114, on the other hand, the CPU 72 sets the power restriction flag F equal to 1 (step S116) and executes a skid occurring state control routine (step S118) shown in FIG. 4. In the skid occurring state control routine, the CPU 72 of the hybrid ECU 70 first compares the angular acceleration α with a preset peak value αpeak (step S150). When the angular acceleration α exceeds the preset peak value αpeak, the peak value αpeak is updated to the current value of the angular acceleration α (step S152). The peak value αpeak represents a peak of the angular acceleration α increasing due to a skid and is initially set equal to 0. Until the angular acceleration α increases to reach its maximum, the peak value αpeak is successively updated to the current value of the angular acceleration α. When the increasing angular acceleration α reaches its maximum, the maximum value of the increasing angular acceleration α is fixed to the peak value αpeak. After setting the peak value αpeak, the CPU 72 sets the maximum torque Tmax as the upper limit of the torque output to the ring gear shaft 32a corresponding to the peak value αpeak (step S154). The procedure of this embodiment refers to a map shown in FIG. 5. The map of FIG. 5 shows a variation in maximum torque Tmax against the angular acceleration α. The maximum torque Tmax is expressed by a function g(α) of the angular acceleration α. In this map, the maximum torque Tmax decreases with an increase in angular acceleration α. The greater peak value αpeak of the increasing angular acceleration α, that is, the heavier skid, sets the smaller value to the maximum torque Tmax and restricts the torque output to the ring gear shaft 32a to the smaller maximum torque Tmax.

The CPU 72 of the hybrid ECU 70 then compares the torque command value Tr* of the ring gear shaft 32a with the maximum torque Tmax (step S156). When the torque command value Tr* does not exceed the maximum torque Tmax, the skid occurring state control routine is terminated. Referring back to the drive control routine of FIG. 2, the CPU 72 controls the engine 22, the first motor MG1, and the second motor MG2 (step S126). The engine 22, the first motor MG1, and the second motor MG2 are controlled with the respective setting values obtained at steps S108 to S112.

When the torque command value Tr* exceeds the maximum torque Tmax at step S156, the torque restriction rate KT (=Tmax/Tr*) is calculated and is stored in a specified area of the RAM 76 (step S158). The maximum torque Tmax is set to the torque command value Tr* of the ring gear shaft 32a (step S160). The torque command value Tm2* of the second motor MG2 is reset by substituting the torque command value Tr* of the ring gear shaft 32a in Equation (1) given above with the maximum torque Tmax (step S162). The skid occurring state control routine is then terminated. The calculated torque restriction rate KT is used as the power restriction rate KP at step S107 in the next cycle of the drive control routine of FIG. 2. Referring back to the drive control routine of FIG. 2, the engine 22, the first motor MG1, and the second motor MG2 are controlled with the modified setting values (step S126). The drive control routine is here terminated. The torque output to the ring gear shaft 32a in the occurrence of a skid is limited to a lower level (that is, the maximum torque Tmax corresponding to the peak value αpeak of the angular acceleration in the map of FIG. 5) for immediate reduction of the skid. This limitation effectively reduces the skid.

Figure 6:
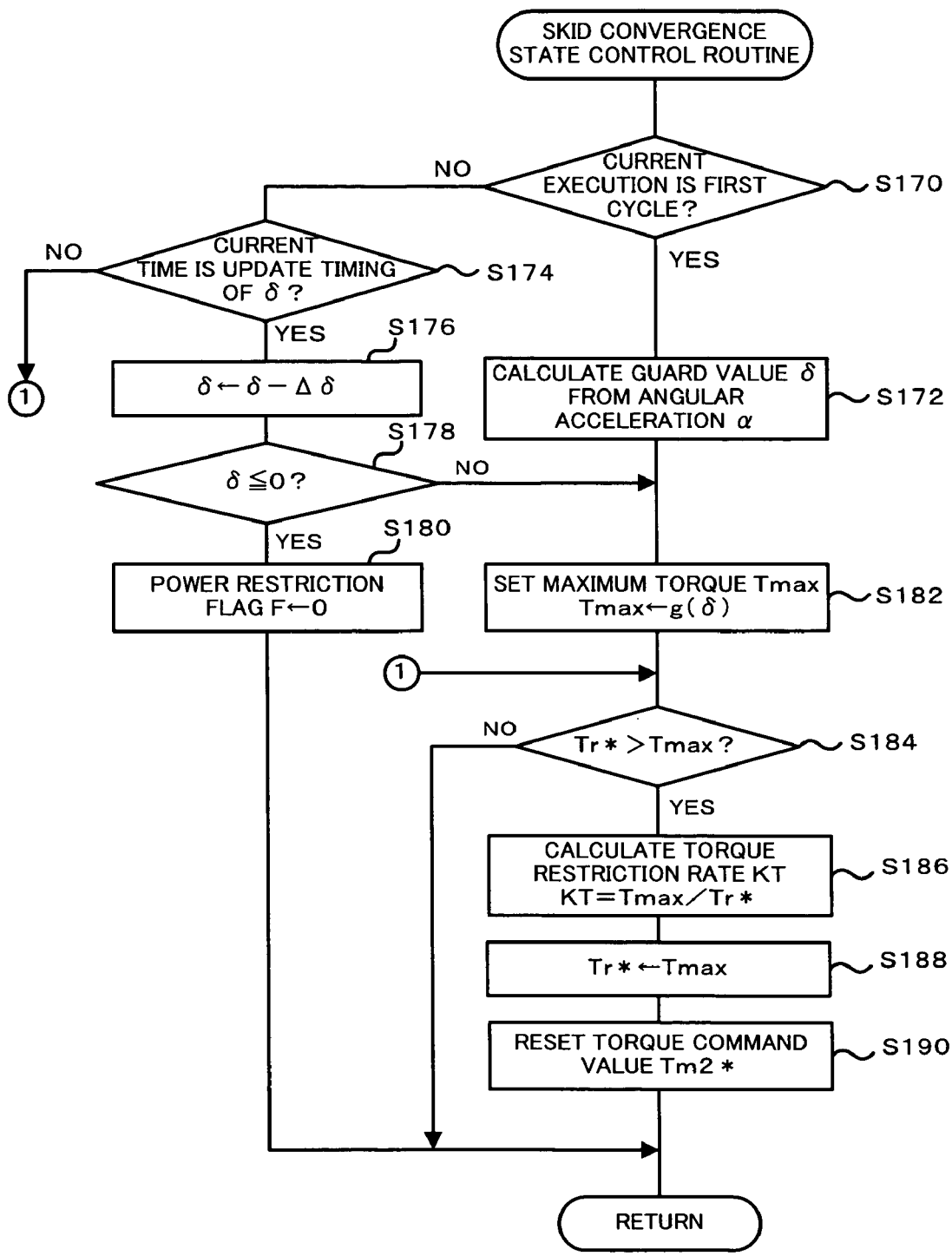
FIG. 6 is a flowchart showing a skid convergence state control routine.

In response to detection of no occurrence of a skid at step S114 and the setting '1' of the power restriction flag F at step S120, the CPU 72 determines whether a predetermined skid convergence condition is satisfied, that is, whether the calculated angular acceleration α has been kept negative for a preset time period (step S122). No satisfaction of the predetermined skid convergence condition means non-convergence of the skid and triggers the skid occurring state control routine described above (step S118). Satisfaction of the predetermined skid convergence condition, on the contrary, means convergence of the skid occurring on the drive wheels 39a and 39b and triggers a skid convergence state control routine (step S124) as shown in FIG. 6. The skid convergence state control routine restores the level of the torque output to the ring gear shaft 32a, which has been restricted in response to a decrease in angular acceleration α in the skid occurring state control routine.

In the skid convergence state control routine, the CPU 72 of the hybrid ECU 70 first determines whether the current execution is a first cycle of this skid convergence state control routine (step S170). This means whether the predetermined skid convergence condition is satisfied for the first time in the current cycle of the drive control routine, while the skid convergence condition has not been satisfied in prior cycles of the drive control routine. When the current execution is the first cycle of the skid convergence state control routine, the CPU 72 integrates the angular acceleration α to give a time integration αint thereof over an integration interval between an increase in angular acceleration α over the preset threshold value αslip and a decrease in angular acceleration α below the preset threshold value αslip, and calculates a guard value δ (expressed in the same unit [rpm/8 msec] as the angular acceleration) as a function of the time integration αint (step S172). The CPU 72 refers to the map of FIG. 5 and sets the maximum torque Tmax corresponding to the calculated guard value δ (step S182). The CPU 72 then executes the processing of steps S184 to S190, which is identical with the processing of steps S156 to S162 in the skid occurring state control routine described above (see FIG. 4), and terminates this skid convergence state control routine. When the current execution is not the first cycle of the skid convergence state control routine at step S170, on the other hand, the CPU 72 determines whether the current timing is an update timing of the guard value δ (step S174). The update timing of the guard value δ comes whenever a predetermined waiting time has elapsed since setting the guard value δ. When the current timing is not the update timing of the guard value δ, the CPU 72 goes to step S184 and subsequent steps. When the current timing is the update timing of the guard value δ, on the contrary, the CPU 72 subtracts a fixed value Δδ from the current setting of the guard value δ to give a new setting of the guard value δ (step S176) and compares the new setting of the guard value δ with the value '0' (step S178). When the new setting of the guard value δ is greater than 0, the CPU 72 refers to the map of FIG. 5 and sets the maximum torque Tmax corresponding to the new setting of the guard value δ (step S182). The CPU 72 then executes the processing of steps S184 to S190, which is identical with the processing of steps S156 to S162 in the skid occurring state control routine described above (see FIG. 4), and terminates this skid convergence state control routine. When the new setting of the guard value δ is not greater than 0 at step S178, no further torque restriction is required. The power restriction flag F is accordingly reset to 0 (step S180), and the skid convergence state control routine is terminated. The level of the torque output to the ring gear shaft 32a gradually increases after convergence of the skid with restriction to the maximum torque Tmax, which increases in a stepwise manner with every elapse of the predetermined waiting time.

Figure 7:
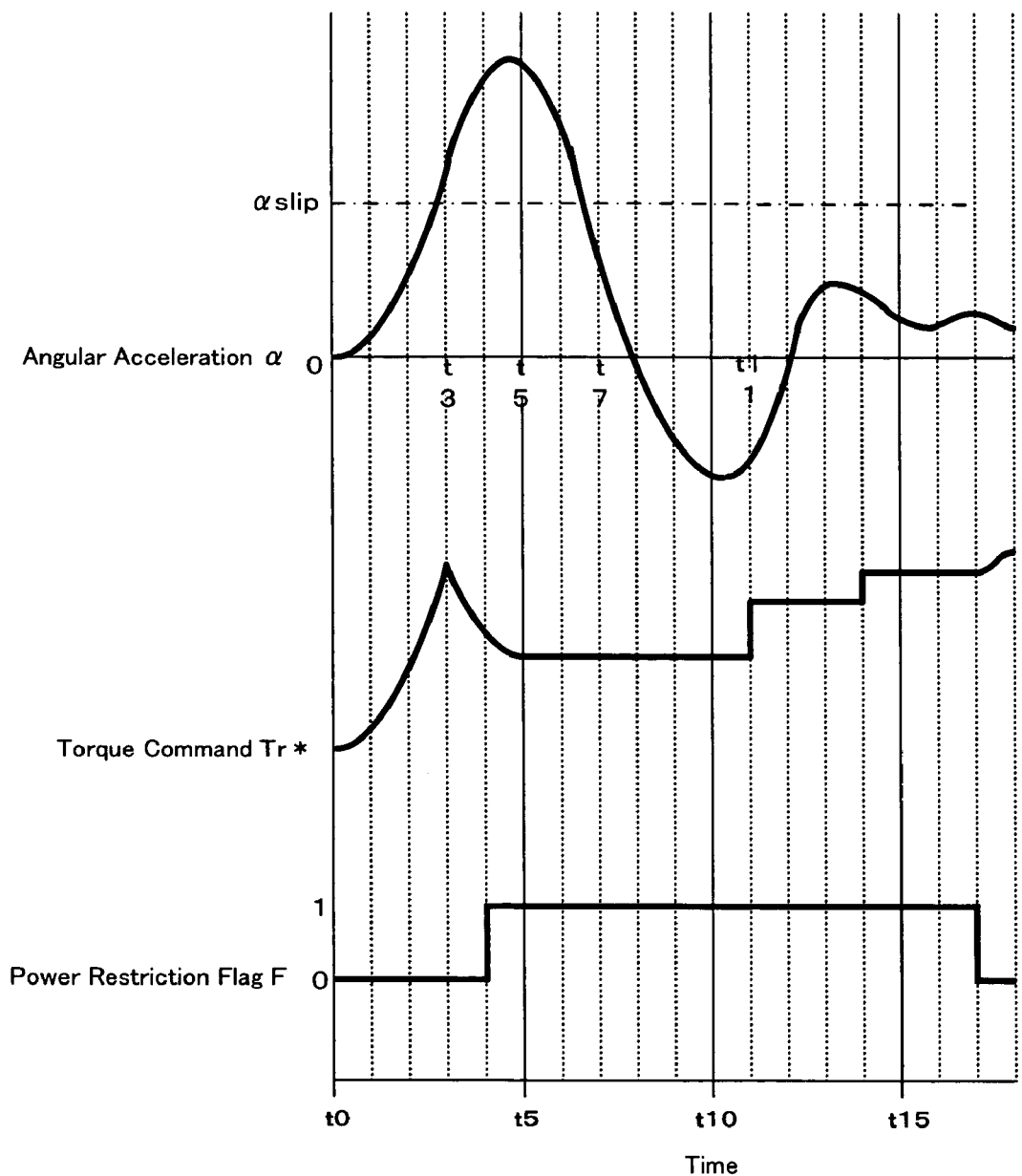
FIG. 7 shows a variation in torque command of the ring gear shaft with a variation in angular acceleration.

FIG. 7 shows a variation in torque command value Tr* of the ring gear shaft 32a with a variation in angular acceleration α of the ring gear shaft 32a. In the illustrated example of FIG. 7, at a time point t3, the angular acceleration α exceeds the preset threshold value αslip and the occurrence of a skid is accordingly detected. Such detection leads to setting of the value '1' to the power restriction flag F and starts restriction of the torque output to the ring gear shaft 32a. The maximum torque Tmax is set corresponding to the value of the angular acceleration α at the time point t3 by referring to the map of FIG. 5. In a next cycle of the drive control routine of FIG. 2 after the time point t3, the power demand Pr computed from the vehicle speed V and the accelerator pedal position AP is updated to the product of the computed power demand Pr and the power restriction rate KP (=the torque restriction rate KT). The control of the engine 22, the first motor MG1, and the second motor MG2 with the updated setting of the power demand Pr continues to a time point t17. At a time point t5, the angular acceleration α reaches its peak. The maximum torque Tmax is set corresponding to the peak value αpeak of the angular acceleration α by referring to the map of FIG. 5. The maximum torque Tmax is kept corresponding to the peak value a peak until a time point t10. At a time point t11 in the illustrated example of FIG. 7 when the negative angular acceleration α has been kept for the preset time period, it is determined that the predetermined skid convergence condition is satisfied and restoration of the torque output level starts. At the time point t11, the maximum torque Tmax is set corresponding to the guard value δ, which depends upon the time integration αint of the angular acceleration α over the integration interval between the time point t3 when the angular acceleration α exceeds the preset threshold value αslip and the time point t7 when the angular acceleration α decreases below the preset threshold value αslip. The guard value δ is updated at every elapse of the predetermined waiting time, and the maximum torque Tmax is set corresponding to the updated guard value δ. At the time point t17, the guard value δ becomes not greater than 0. This leads to setting of the value '0' to the power restriction flag F and terminates the restriction of the torque output to the ring gear shaft 32a and limitation of the power demand Pr. Restriction of the torque output to the ring gear shaft 32a limits the power demand Pr with the torque restriction rate KT (=Tmax/Tr*) of the ring gear shaft 32a.

As described above, the procedure of this embodiment computes the power demand Pr to be output to the ring gear shaft 32a or the drive shaft from the vehicle speed V and the accelerator pedal position AP, which depends upon the accelerator opening corresponding to the driver's depression of the accelerator pedal 83. The engine 22, the first motor MG1, and the second motor MG2 are controlled by the corresponding ECUs with the computed power demand Pr. In response to detection of a skid on the drive wheels 39a and 39b, the level of the torque output to the ring gear shaft 32a is restricted for reduction of the skid. Under the restriction of the torque output to the ring gear shaft 32a, the control procedure limits the power demand Pr, which is computed from the accelerator pedal position AP and the vehicle speed V. The control of the engine 22 with the unchanged large power demand Pr under the restriction of the torque output to the ring gear shaft 32a causes a large engine noise beyond the driver's expectation based on the vehicle driving state with restriction of the torque level. The control procedure of the embodiment limits the power demand Pr under such conditions, thus restraining a large engine noise beyond the driver's expectation based on the vehicle driving state and preventing the driver from feeling uncomfortable.

The control procedure of the embodiment limits the power demand Pr, which is computed from the accelerator pedal position AP and the vehicle speed V, with the power restriction rate KP that is identical with the torque restriction rate KT for restricting the torque output to the ring gear shaft 32a. A high level of restriction of the torque output to the ring gear shaft 32a thus results in significant limitation of the power demand Pr. A low level of restriction of the torque output to the ring gear shaft 32a results in slight limitation of the power demand Pr. This arrangement desirably prevents the driver from feeling uncomfortable.

The control procedure of the embodiment restores the restricted level of the torque output to the ring gear shaft 32 with moderate torque restriction of increasing the maximum torque Tmax in a stepwise manner at every elapse of the predetermined waiting time after convergence of the skid. This arrangement desirably prevents abrupt cancellation of the torque restriction and generation of a large torque immediately after convergence of the skid. The power demand Pr, which depends upon the accelerator pedal position AP and the vehicle speed V, is limited even in the period of this moderate restriction of the torque output to the ring gear shaft 32a. Such control results in a smooth change of the engine noise and effectively prevents the driver from feeling uncomfortable.

The embodiment discussed above is to be considered in all aspects as illustrative and not restrictive. There may be many modifications, changes, and alterations without departing from the scope or spirit of the main characteristics of the present invention.

For example, the limitation level of the power demand Pr, which is computed from the accelerator pedal position AP and the vehicle speed V (that is, the limited power demand Pr at step S107) maybe satisfied by only the electric power output from the battery 50 to drive the second motor MG2 and rotate the ring gear shaft 32a or the drive shaft. Even under such conditions, the control procedure may not stop the engine 22 but may keep the engine 22 stand by for an immediate response to an increase in power demand Pr after cancellation of the restriction of the torque output to the ring gear shaft 32a. This control also prevents frequent stops and starts of the engine 22. The engine 22 may be run idle or kept at an idle without a stop.

Figure 2:
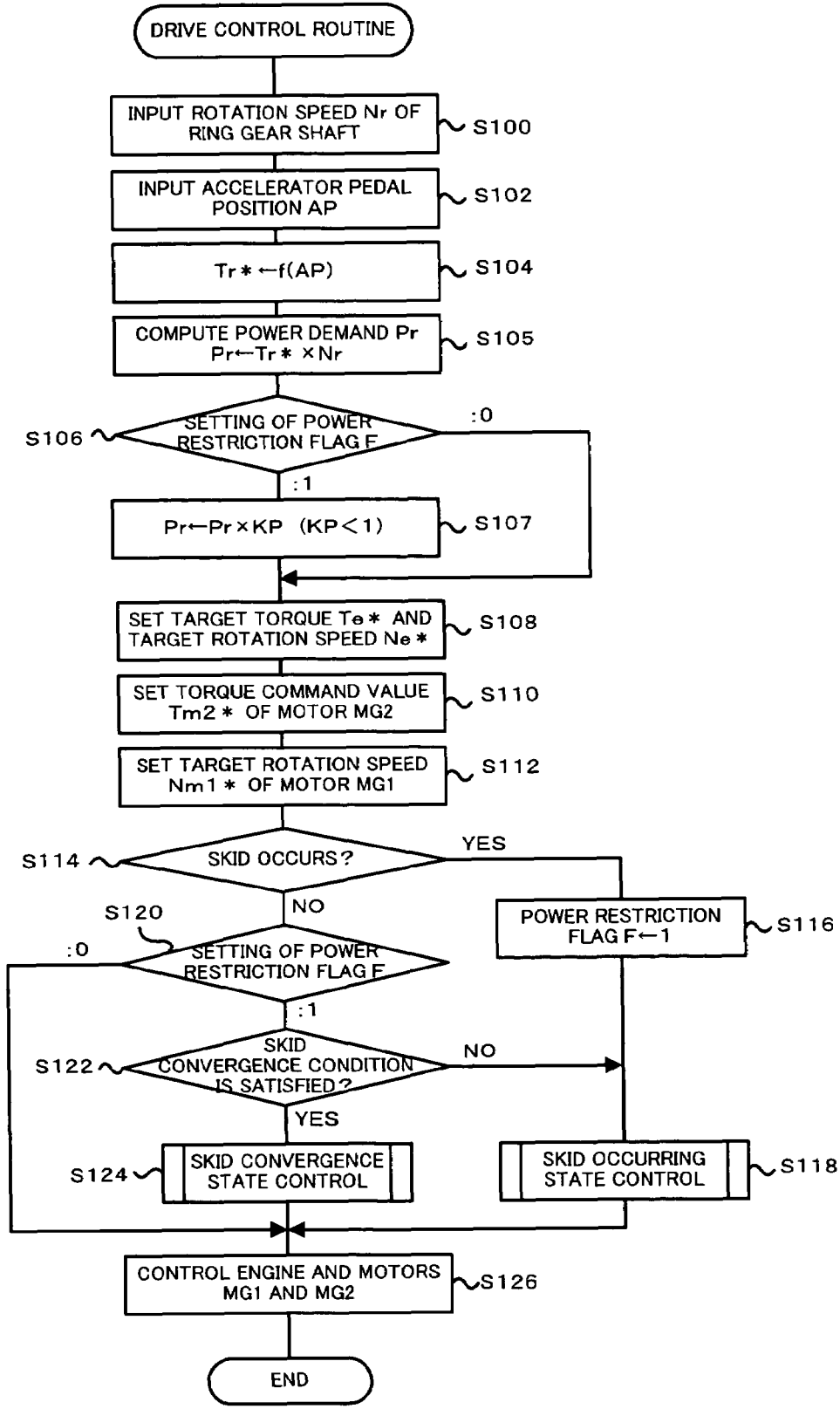
FIG. 2 is a flowchart showing a drive control routine.

The drive control routine of FIG. 2 in the above embodiment is on the assumption of no requirement of charging the battery 50. In the event of requirement of charging the battery 50 with electric power generated by the motor MG1, the torque restriction is set on only a portion of the power demand required for driving the vehicle, while the residual portion of the power demand required for charging is excluded from the object of the torque restriction.

In the control procedure of the above embodiment, the power restriction rate KP is set equal to the torque restriction rate KT. The power restriction rate KP may alternatively be calculated as a function of the torque restriction rate KT. For example, a leveled value of the torque restriction rate KT may be set to the power restriction rate KP. More specifically, the power restriction rate KP may be regulated not to vary simultaneously with a variation in torque restriction rate KT but to gradually approach to the torque restriction rate KT with elapse of time. Even in the case of an abrupt variation in torque restriction rate KT, this arrangement ensures a moderate change of the power demand Pr with limitation of the gradually varying power restriction rate KP with elapse of time. The moderate change of the power demand Pr results in a smooth change of the engine noise and effectively prevents the driver from feeling uncomfortable. Another method may set the product of the torque restriction rate KT and a specified coefficient k to the power restriction rate KP. Still another method may set the power restriction rate KP to a fixed value, regardless of the variation in torque restriction rate KT. This last method prevents an uncomfortable change of the engine noise by relatively simple control.

The control procedure of the above embodiment detects the occurrence or no occurrence of a skid, based on the variation in angular acceleration α. In addition to or in place of such detection, one modified procedure may divide a difference between a wheel speed Va of driven wheels and a wheel speed Vb of drive wheels by the wheel speed Va to calculate a skid rate (Va−Vb)/Va, compare the calculated skid rate with a predetermined reference value, and detect the occurrence of a skid when the calculated skid rate exceeds the predetermined reference value.

Figure 8:
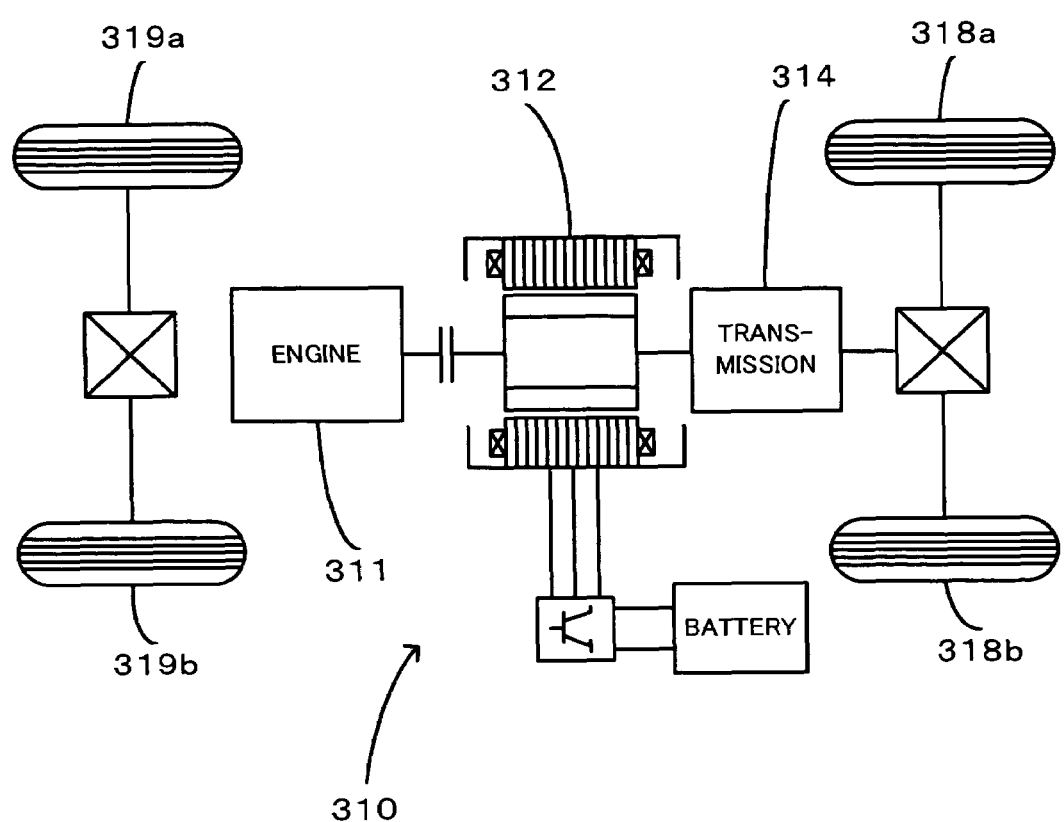
FIG. 8 schematically illustrates the configuration of a hybrid vehicle in another embodiment.

The technique of the invention is not restricted to the hybrid vehicle 20 of the embodiment described above, but is also applicable to diversity of series and parallel hybrid vehicles. Another possible application of the invention is a hybrid vehicle 310 including an engine 311 that is connected with a drive shaft linked to drive wheels 318a and 318b via a transmission 314 (for example, a continuous variable transmission or an automatic transmission) and a motor 312 that is placed after the engine 311 and is connected with the drive shaft via the transmission 314 (or a motor that is directly connected with the drive shaft), as shown in FIG. 8.

INDUSTRIAL APPLICABILITY

The technique of the invention is effectively applied to automobile industries and other vehicle-related industries.

The invention claimed is:

1. A vehicle control apparatus, where a motor is driven with power of an engine to rotate a drive shaft linked to drive wheels, said vehicle control apparatus comprising:
   a power demand determination module that determines a power demand to be output to the drive shaft according to a vehicle driving state;
   a control module that controls the engine and the motor with the determined power demand;
   a skid detection module that detects a skid occurring on the drive wheels; and
   a torque restriction module that, in response to detection of a skid by said skid detection module, restricts a torque level of the drive wheels for reduction of the skid,
   wherein under restriction of the torque level of the drive wheels by said torque restriction module, said power demand determination module limits the power demand, which is determined according to the vehicle driving state, with a power restriction rate that is regulated to have a specified relation to a torque restriction rate of restricting the torque level of the drive wheels.

2. A vehicle control apparatus in accordance with claim 1, wherein said power demand determination module limits the power demand, which is determined according to the vehicle driving state, with a fixed setting of the power restriction rate, regardless of a variation in torque restriction rate of restricting the torque level of the drive wheels.

3. A vehicle control apparatus in accordance with claim 1, wherein said power demand determination module limits the power demand, which is determined according to the vehicle driving state, with the power restriction rate that is regulated corresponding to the torque restriction rate of restricting the torque level of the drive wheels.

4. A vehicle control apparatus in accordance with claim 3, wherein said power demand determination module limits the power demand, which is determined according to the vehicle driving state, with the power restriction rate that is regulated to approach to the torque restriction rate with elapse of time.

5. A vehicle control apparatus in accordance with claim 1, wherein said torque restriction module restores the restricted torque level of the drive wheels with moderate limitation of the torque level of the drive wheels after convergence of the skid detected by said skid detection module.

6. A vehicle control apparatus in accordance with claim 1, said vehicle control apparatus further comprising:
   an accumulator that is capable of driving the motor simultaneously with or independently of the engine; and
   an engine stop prohibition module that controls said accumulator to drive the motor and prohibits a stop of the engine under limitation of the power demand, which is determined according to the vehicle driving state, by said power demand determination module.

7. A vehicle control apparatus in accordance with claim 6, wherein said accumulator is either of a battery and a capacitor.

8. A vehicle with a vehicle control apparatus in accordance with claim 1 mounted thereon.

9. A vehicle control method for a vehicle, where a motor is driven with power of an engine to rotate a drive shaft linked to drive wheels, said vehicle control method comprising the steps of:
   (a) determining a power demand to be output to the drive shaft according to a vehicle driving state;
   (b) controlling the engine and the motor with the determined power demand;
   (c) detecting a skid occurring on the drive wheels; and
   (d) restricting a torque level of the drive wheels for reduction of the skid, in response to detection of a skid in said step (c),
   wherein under restriction of the torque level of the drive wheels by said step (d), said step (b) limits the power demand, which is determined according to the vehicle driving state.

10. A vehicle control method in accordance with claim 9, wherein said step (b) limits the power demand, which is determined according to the vehicle driving state, with a power restriction rate that is regulated to have a specified relation to a torque restriction rate of restricting the torque level of the drive wheels.

11. A Vehicle control method in accordance with claim 10, wherein said step (b) limits the power demand, which is determined according to the vehicle driving state, with a fixed setting of the power restriction rate, regardless of a variation in torque restriction rate of restricting the torque level of the drive wheels.

12. A vehicle control method in accordance with claim 11, wherein said step (b) limits the power demand, which is determined according to the vehicle driving state, with the power restriction rate that is regulated corresponding to the torque restriction rate of restricting the torque level of the drive wheels.

13. A vehicle control apparatus in accordance with claim 2, wherein said torque restriction module restores the restricted torque level of the drive wheels with moderate limitation of the torque level of the drive wheels after convergence of the skid detected by said skid detection module.

14. A vehicle control apparatus in accordance with claim 3, wherein said torque restriction module restores the restricted torque level of the drive wheels with moderate limitation of the torque level of the drive wheels after convergence of the skid detected by said skid detection module.

* * * * *

UNITED STATES PATENT AND TRADEMARK OFFICE
CERTIFICATE OF CORRECTION

PATENT NO. : 7,445,066 B2  Page 1 of 1
APPLICATION NO. : 10/525727
DATED : November 4, 2008
INVENTOR(S) : Akira Hommi et al.

It is certified that error appears in the above-identified patent and that said Letters Patent is hereby corrected as shown below:

| Column | Line | |
|---|---|---|
| 8 | 46 | After "peak value" change "a peak" to --αpeak--. |
| 10 | 58 | After "value" change "a peak" to --αpeak--. |

Signed and Sealed this

Fourth Day of August, 2009

JOHN DOLL
*Acting Director of the United States Patent and Trademark Office*